Oct. 17, 1961     K. A. SCHAEFER ET AL     3,004,275
MACHINE TOOL FOR REMOVING MATERIAL FROM A CONTAINER
Filed Sept. 9, 1954     4 Sheets-Sheet 1

Fig. 1

INVENTORS
Kenneth A. Schaefer,
Robert X. Sedgwick
BY
Henry J. Wutschel
ATTORNEY

United States Patent Office 3,004,275
Patented Oct. 17, 1961

3,004,275
MACHINE TOOL FOR REMOVING MATERIAL FROM A CONTAINER
Kenneth A. Schaefer, Milwaukee, and Robert K. Sedgwick, Waterford, Wis., assignors to Kearney & Trecker Corporation, West Allis, Wis., a corporation of Wisconsin
Filed Sept. 9, 1954, Ser. No. 455,043
16 Claims. (Cl. 15—104.1)

This invention relates generally to machine tools and more particularly to a milling machine especially adapted to remove material from a container.

In extracting titanium metal from the ore, the reduction process yields the refined metal in a very porous mass termed "sponge," which is contained in a metal crucible. Such titanium is solidified in the crucible, and the portion adjacent to the walls of the crucible absorbs impurities from the crucible to render it generally unsatisfactory for use as titanium metal. The pure titanium sponge is the raw material which is processed into its ultimate form, and it is removed from the crucible by chipping or machining it out, to reduce it to chips. Since titanium is an extremely reactive metal at elevated temperatures, the heat generated in the machining operation may have an adverse effect on it, and it is therefore preferable to perform the machining operation in the presence of an inert gas such as argon. Furthermore, only the pure titanium sponge is processed, so it is necessary to separate the impure layer adjacent to the walls of the crucible from the pure titanium sponge disposed interiorly of the impure outer layer.

It is therefore a general object of the present invention to provide an improved machine tool especially adapted to remove a mass of material from a container.

Another object of the present invention is to provide a milling machine particularly adapted to operate upon solidified metal in a container to reduce it to chips for the purpose of removing the metal from the container.

Another object is to provide an improved milling machine arranged to exclude air from the material being operated on.

Another object is to provide a milling machine for removing a mass of metal from a container by transforming the mass to chips, the machine being arranged so that as the chips are removed from the mass they fall out of the container into a suitable receptacle.

A further object is to provide a milling machine for machining a mass of metal out of a container and operable to remove the interior portion of the mass of the container in one operation, and the exterior portion of the mass adjacent to the walls in a second operation, so that the two portions of the mass may be separated.

A further object is to provide a milling machine employing a circular expandable cutter with power operated mechanism incorporated into the machine for expanding or retracting the cutter without removing it from its cooperating spindle.

A still further object is to provide a machine tool adapted to rotate a removable crucible containing a mass of metal relative to a revolving cutter for the purpose of feeding the metal to the cutter to effect a machining operation upon it.

According to this invention there is provided an improved milling machine arranged for the specific purpose of machining refined titanium sponge out of the crucibles in which it is contained. It comprises a base upon which a rotatable spindle is supported for axial movement. The axis of the spindle is disposed at an angle, with its cutter supporting end raised from the horizontal so that axial movement of the spindle will serve to feed the cutter upwardly at an angle with respect to the horizontal. The opposite end of the base rotatably supports a drum which is adapted to receive the crucible containing the titanium sponge, with the crucible being secured to the drum to rotate with it. The drum is supported at an angle corresponding to the angle of the spindle, and the crucible is carried by the drum with its open end downward, facing the cutter secured to the end of the spindle. The layer of titanium sponge proximate to the walls of the crucible absorbs impurities from the crucible to render it unsuitable for normal use, and must therefore be separated from the remaining portion of the mass of titanium sponge in the crucible. This impure layer extends inwardly from the walls of the crucible approximately one and one-half inches. In order to remove these two portions of the mass separately, an expandable cutter is provided, which when retracted extends from a point slightly beyond the axis of rotation of the crucible to within approximately one and one-half inches of the wall of the crucible. To effect the machining operation, the drum is rotated by power to rotate the crucible relative to the cutter, the latter of course, being rotated about its axis while the spindle is being moved axially to feed the cutter into the crucible to operate on the titanium sponge contained therein. The rotation of the crucible causes the cutter to cut in a circular path, removing chips of titanium from the mass as the crucible is rotated and the revolving cutter is fed inwardly into the crucible. Since the diameter of the cutter overlaps the axis of rotation of the crucible, the action of the cutter serves to actually bore a large hole in the mass of titanium sponge, leaving a wall approximately one and one-half inches thick, which is that portion of the titanium sponge containing the impurities from the crucible. After the pure titanium sponge has been reduced to chips, the cutter is withdrawn from the crucible and expanded so that it engages the one and one-half inch wall of impure titanium sponge. The machine is then operated in the same manner to remove this impure material in a separate operation. Since the crucible is carried at an angle with its open end extending downwardly, facing the cutter, the chips, when formed, will fall out of the crucible. A conduit is provided for receiving these chips and carries them into a suitable receptacle. Due to the peculiar characteristics of titanium, it is preferable that it not be exposed to air, and the cutter therefore operates upon the titanium sponge within a sealed enclosure filled with an inert gas such as argon, with the conduit and receptacle for receiving the chips forming a part of such enclosure.

The foregoing and other objects of this invention, which will become more fully apparent from the following detailed description, may be achieved by the particular illustrative machine tool depicted in and described in connection with the accompanying drawings, in which.

Figure 1:
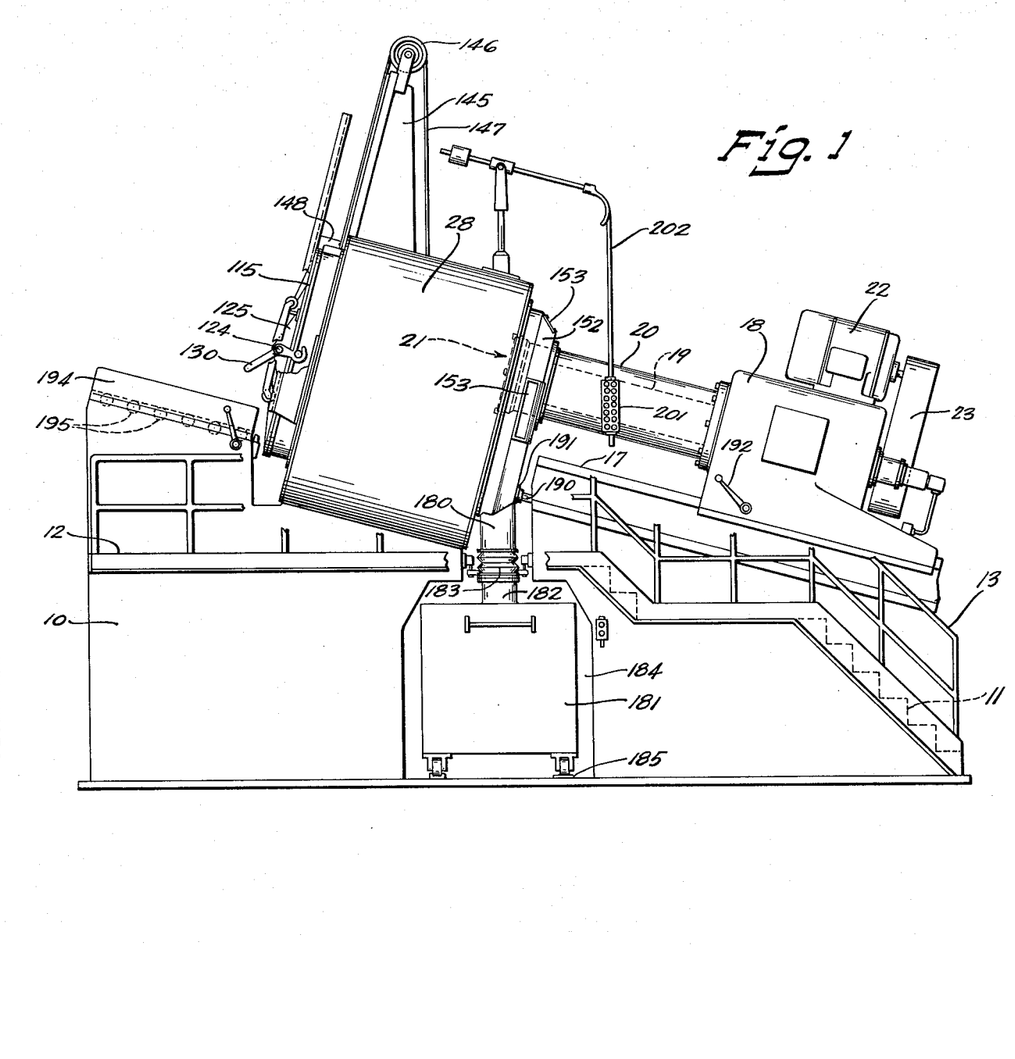
FIGURE 1 is a view in side elevation of a machine tool incorporating the novel features of the present invention.

Reference is now made more particularly to the drawings, and specifically to FIG. 1 thereof showing a machine tool, comprising essentially a base 10 having stairs 11 leading to a platform 12 provided for the purpose of gaining access to the several operating mechanisms of the machine. A guard rail 13 extends along the stairs 11 and platform 12 for the safety of the operator.

A set of ways 17 is formed on the rearward portion of the base 10 for engagement with cooperating ways (not shown) formed on the under side of a spindle head 18 for slidably supporting the spindle head 18 on the base 10. The spindle head 18 rotatably supports a spindle 19 which extends through a quill 20 secured at one end to the spindle head 18. At its extending end the spindle 19 supports a cutter 21 exteriorly of the quill 20. The spindle 19 is rotated by power obtained from an electrical motor 22 mounted on top of the spindle head 18. The power is transmitted from the motor 22 through a belt transmission 23 to the spindle 19 to rotate it and its associated cutter 21.

As previously mentioned, the spindle head 18 is slidably mounted on the ways 17 to effect axial feeding movement of the cutter 21. Power means (not shown) are provided for actuating the spindle head 18 in its path of movement at a preselected uniform rate. Such power means may be of any well known type, as for example, a piston and cylinder mechanism for hydraulic actuation of the spindle head 18, or the well known screw and nut mechanism operated by an electric motor in well known manner for driving the spindle head 18.

The ways 17 are disposed at an angle with the horizontal, as illustrated in FIG. 1, sloping upwardly from the rear of the machine. The spindle 19 is supported with its axis at the same angle relative to the horizontal, parallel with the ways 17, so that when the spindle head 18 is moved forwardly from the rear of the machine, the spindle 19 and its cutter 21 will be moving upwardly at the same time that they are progressing forwardly. The reasons for this arrangement will become apparent from the description that follows.

Figures 2, 3:
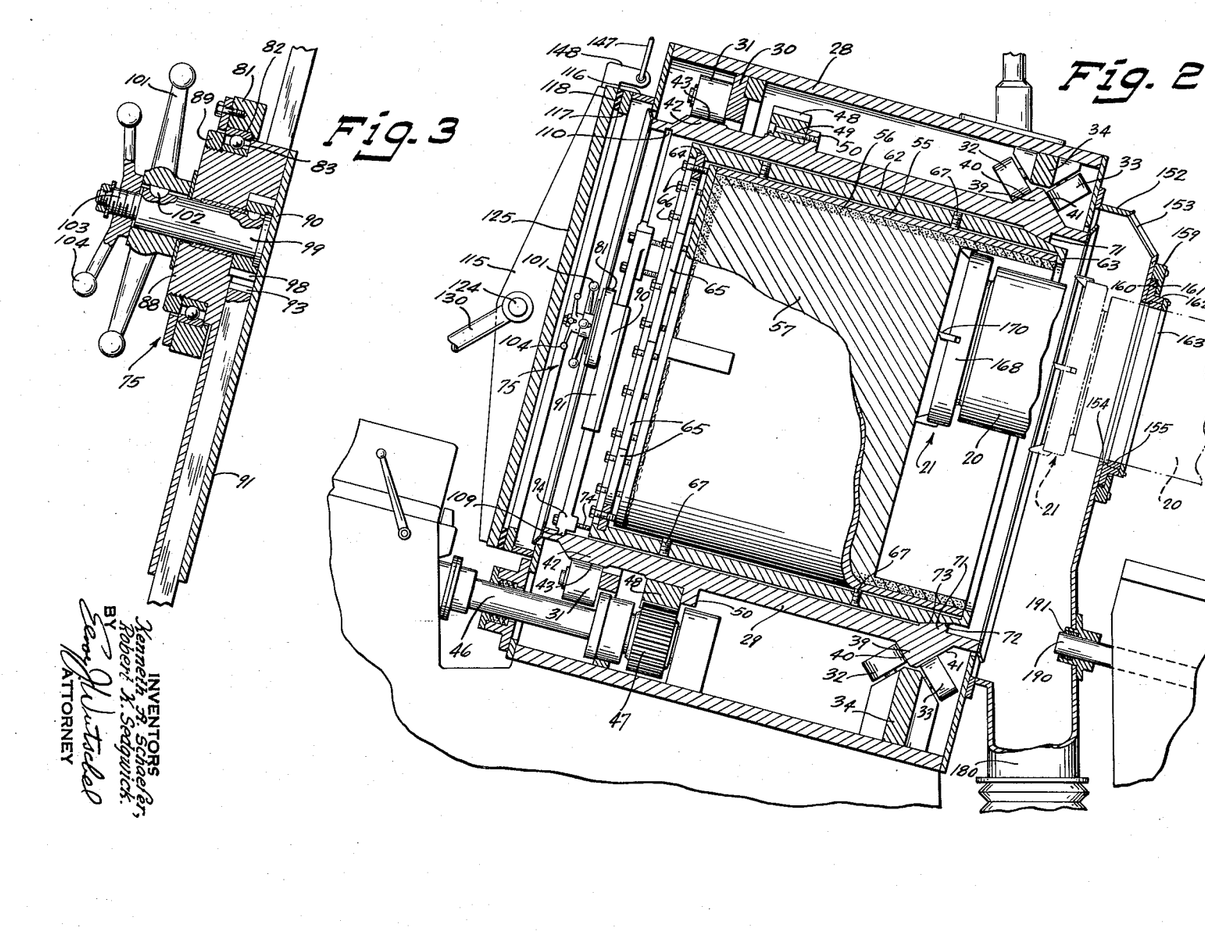
FIG. 2 is an enlarged fragmentary view, substantially in vertical section through the rotatable drum, with the titanium sponge carrying crucible locked in position in the drum, and partially broken away to show the location of the pure portion of titanium sponge in relation to the impure portion, with the cutter operating upon the pure portion.
FIG. 3 is a fragmentary view in vertical section through the mechanism for operating the spider, shown in FIG. 2, for locking the crucible in position within the drum.

The forward end of the base 10 rigidly supports an upstanding U-shaped housing 28 mounted at an angle corresponding to the angle of the spindle 19 so that the axis of the housing 28 is parallel with the axis of the spindle 19. As best seen in FIG. 2, the housing 28 functions to rotatably support a drum 29. To this end, the housing 28 has secured to its inner surface an annular ring 30 which supports a plurality of rollers 31, with their axes equally spaced about a circle.

Two additional sets of rollers 32 and 33 are supported at the opposite end of the housing 28, being carried by an annular bracket 34 secured to the interior of the housing 28. The rollers 32 are mounted in a circle about the drum 29, with each having its axis located 45° from the axis of rotation of the drum 29. In a similar manner, the rollers 33 are disposed in a circle, with each having its axis located 45° from the axis of the drum 29, but 90° from the axes of the rollers 32. Therefore, the rollers 32 and 33 are supported so that their peripheral surfaces form a V for cooperation with a protrusion 39, of V-shaped cross section, formed on the drum 29. The protrusion 39 presents two annular surfaces 40 and 41, each forming one leg of the V and extending 90° from the other. In operation, the V-shaped protrusion 39 is disposed within the V-shaped annular space formed by the peripheries of the rollers 32 and 33, with the rollers 32 riding upon the surface 40 and the rollers 33 engaging the surface 41.

Another annular protrusion 42 is provided on the opposite end of the drum 29. It presents a peripheral surface 43 for engagement with the peripheries of the rollers 31. It is obvious therefore, that the three sets of rollers 31, 32 and 33 cooperate with the three annular surfaces 43, 40 and 41 respectively, to rotatably support the drum 29 within the housing 28, with the V-shaped protrusion 39 operating in conjunction with the two sets of rollers 32 and 33 to prevent axial movement of the drum 29.

Power for rotating the drum 29 is obtained from a hydraulic motor (not shown) connected to drive a shaft 46 journalled in the housing 28. A pinion 47 is keyed to the end of the shaft 46 in position to mesh with a ring gear 48 secured by screws 49 to an annular flange 50 formed integrally with the drum 29. Therefore, as the pinion 47 is rotated by the shaft 46, it effects a rotation of its cooperating ring gear 48 and its associated drum 29 at a reduced rate.

As previously mentioned, the machine shown in the drawings is especially adapted for removing a mass of titanium sponge from the crucible in which it is contained. The drum 29 functions to receive the crucible with the titanium sponge contained therein, and rotate the crucible with its contents, relative to the cutter 21 for effecting a feeding movement of the titanium sponge to the cutter 21 in a circular path. In FIG. 2 a crucible 55 is shown in position within the drum 29, partially broken away to reveal its contents. It will be noted that the view in FIG. 2 illustrates two compositions of titanium sponge within the crucible 55, one being the relatively narrow outer layer of impure titanium sponge indicated by the reference numeral 56. This layer has been found to be approximately one and one-half inches thick, and constitutes titanium which has absorbed impurities from the walls of the crucibles. It is for this reason that the layer adjacent to the walls of the crucible 55 contains these impurities.

The remaining contents of the crucible 55, within the impure layer 56, is pure titanium sponge, identified by the reference numeral 57. The pure titanium sponge 57 is the raw material which is processed into the final product. On the other hand, the impure layer of titanium sponge 56 is unsatisfactory for such use, and therefore must be separated from the pure titanium sponge 57 in removing them from the crucible. For this reason, the titanium sponge 57 is first removed from the crucible in one operation, as will be later described, and a separate operation is performed for removing the impure layer of titanium sponge 56.

In order to effectively secure the crucible 55 within the drum 29, it is placed in a holder 62 before being placed within the drum 29. The holder 62 is of cylindrical configuration open at both ends and has an interiorly extending annular flange 63 formed at one end. The crucible is placed within the holder 62 with the edge of its wall at its open end bearing against the flange 63. At its opposite end, the holder 62 is provided with an annular recess 64 formed about the inner periphery of its wall, in proximity to the edge. The recess 64 is provided for receiving the outer diameter of a plurality of arcuate segments 65, placed in juxtaposition about the entire recess 64, so that they, in effect, form a ring broken only by the splits dividing the ends of the segments 65.

Each of the segments 65 has three screws 66 threaded through it with their ends bearing against the bottom of the crucible 55. After the segments 65 are placed within the recess 64, the screws 66 are tightened against the bottom of the crucible 55 to lock the segments 65 in position, and at the same time force the upper edge of the crucible 55 into tight engagement with the flange 63 of the holder 62. In this manner the segments 65 and the screws 66 cooperate with the flange 63 to secure the crucible 55 within the holder 62 against relative axial movement.

In addition, further securing means are provided for holding the crucible 55 within the holder 62, these holding means comprising set screws 67 threaded through the walls of the holder 62 into tight engagement with the periphery of the crucible 55. The set screws 67 serve to prevent any lateral movement of the crucible 55 within the holder 62, and with the screws 66 function to securely hold the crucible within the holder.

With the crucible 55 thus secured within the holder 62, the latter is placed within the drum 29 and attached to it so that these three members rotate as a unit. The holder 62 includes an annular tapered surface 72 formed at its rightward end as viewed in FIG. 2, in position to engage a mating annular tapered surface 73 formed on a projection 71 extending interiorly from the wall of the drum 29. The engagement of these tapered surfaces 72 and 73 serves to center the holder 62 within the drum 29 as well as to prevent its lateral movement.

The holder 62 with the crucible 55 contained therein is introduced into the drum 29 through the opening appearing on the left side in FIG. 2, and is moved rightwardly into the drum 29 until the tapered surfaces 72 and 73 come into engagement. These mating tapered surfaces are forced into tight engagement by a plurality of screws 74 threaded into the ends of a spider generally identified by the numeral 75, and tightened against the edge of the walls of the holder 62 to force it rightwardly as viewed in FIG. 2 to bring its tapered surface 72 into tight engagement with the tapered surface 73 of the drum 29.

Figure 4:
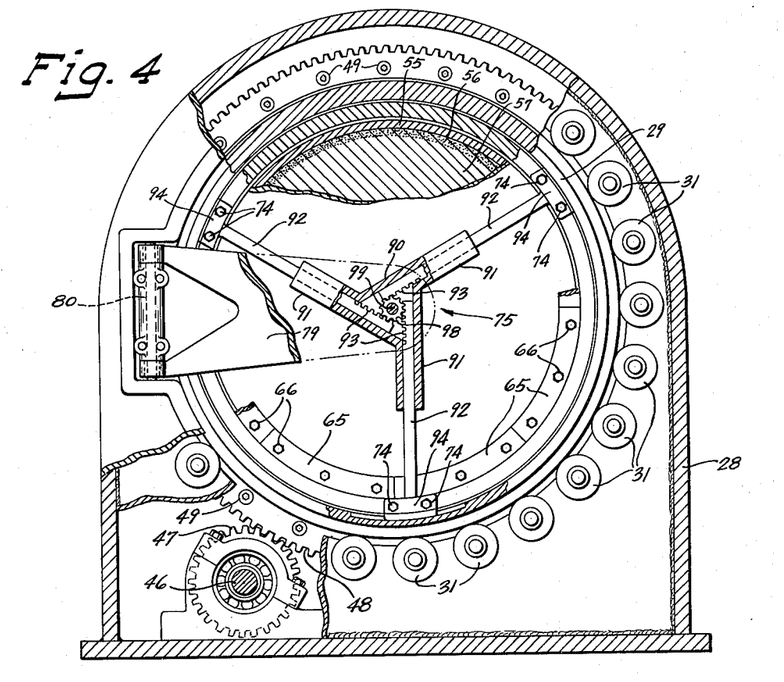
FIG. 4 is an enlarged fragmentary view partly in front elevation and partly in section depicting the rotatable drum and its associated mechanism.

When in operating position, the spider 75 is disposed in the opening of the drum 29 through which the holder 62 passes when being inserted or removed from the drum. It is therefore necessary to remove the spider 75 from its operating position when removing or inserting the holder 62 into the drum 29, and to this end, the spider 75 is supported by the housing 28 on a hinged mounting so that it may be conveniently swung away to a position wherein it will not obstruct the opening. To this end, a bracket 79 illustrated in FIG. 4, is pivoted at one end about a pin 80 secured to the housing 28. A circular enlargement 81 best shown in FIG. 3, is formed integrally at the opposite end of the bracket 79, and presents a bore 82 for receiving an antifriction bearing 83, provided for rotatably supporting the spider 75.

The spider 75 comprises a hub 88 disposed within the inner race of the bearing 83, and fixed thereto by a collar 89 threaded onto the hub 88 and tightened against the inner race of the bearing 83. As best seen in FIGS. 3 and 4, a bracket 90 is formed integrally with the hub 88, and includes three hollow legs 91 extending laterally from the hub 88 in equally spaced angular relationship. Each of the legs 91 slidably supports an arm 92 having a gear rack 93 formed on its inner end and a lug 94 at its outer end. The three gear racks 93 are all in mesh with a single pinion 98 keyed to the end of a stub shaft 99. The stub shaft 99 is journalled in the hub 88 with its end opposite the pinion 98 extending outwardly of the hub to receive a star wheel 101 which is fixed thereto by a key 102. With this arrangement, the rotation of the star wheel 101 will cause a corresponding rotation of the stub shaft 99 and its associated pinion 98. Since the pinion 98 is in mesh with the three gear racks 93 formed on the arms 92, its rotation will effect axial movement of the three arms 92.

The stub shaft 99 includes a reduced threaded portion 103 extending beyond the star wheel 101 to receive a smaller star wheel 104 which has a threaded bore in its hub for engaging the threaded portion 103. To lock the spider 75 in a desired position, the star wheel 104 is rotated about the threaded portion 103 to move its hub into tight engagement with the hub of the star wheel 101. The pressure of the hub of the star wheel 104 bearing against the star wheel 101 serves to lock the latter in the desired position and thereby prevents accidental movement of the arms 92.

As best seen in FIG. 2, the lugs 94 of the arms 92 are provided with a lip 109 which extends outwardly of the lug 94 in position to enter an annular slot 110 formed in the inner diameter of the wall of the drum 29 slightly beneath the opening through which the holder 62 is introduced.

In operation, the hinged bracket 79 is pivoted to swing the spider 75 into operating position. The star wheel 104 is then loosened to permit rotation of the star wheel 101 to cause a corresponding rotation of its associated pinion 98. By reason of its meshing engagement with the gear racks 93, rotation of the pinion 98 will effect an axial movement of the arms 92 to move the lips 109 of the lugs 94 into the slot 110. After the lips 109 have been positioned within the slot 110 the star wheel 104 is tightened upon the star wheel 101 to clamp it and thereby lock the spider 75, to prevent accidental movement of the lips 109 out of the slot 110. The screws 74 are then threaded through the lugs 94 to bear tightly against the edge of the wall of the holder 62 to force the holder rightwardly as viewed in FIG. 2, and bring its tapered surface 72 into tight engagement with the tapered surface 73 formed on the drum 29.

This serves to firmly anchor the holder 62 within the drum 29 so that when the drum 29 is rotated the holder 62 and the crucible 55 contained therein will rotate with it as a unit. As the drum 29 is rotated, the spider 75 will rotate with it relative to its supporting bracket 79 by reason of its hub 88 being journalled in the circular enlargement 81.

As previously mentioned, due to the properties of titanium, it may be desirable to perform the operation upon this material within the presence of an inert gas. To accomplish this it is, of course, necessary to seal the interior of the housing 28 to exclude the air therefrom. The opening through which the holder 62 passes is sealed by a cover 115 seated upon a collar 116, best seen in FIG. 2, which is fixed to the housing 28 about the opening through which the holder 62 is inserted. The collar 116 includes an annular inwardly extending flange 117 presenting an annular surface for receiving an annular seal 118 fixed to the underside of the cover 115 about its periphery. The cover 115 is clamped to the collar 116 by a clamping mechanism generally identified by the reference numeral 123 and illustrated in FIGS. 6, 7 and 8.

Figure 6:
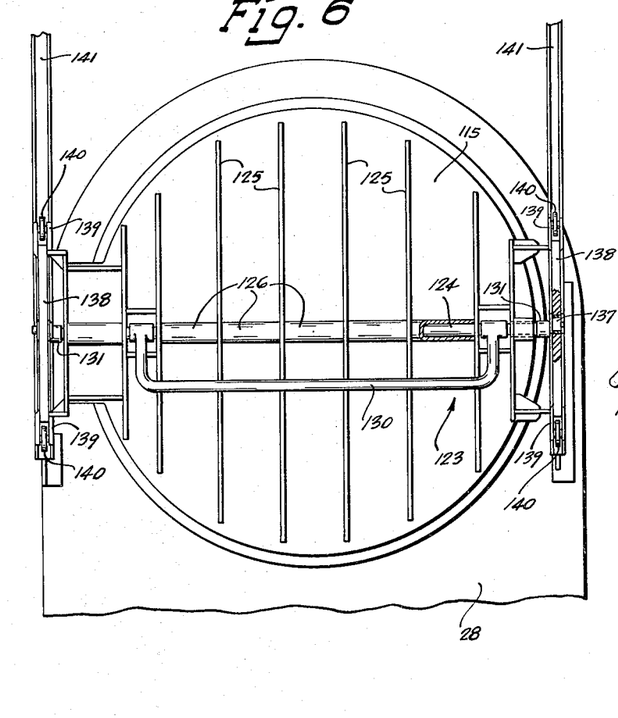
FIG. 6 is a fragmentary view in front elevation illustrating the slidable cover for sealing the forward opening of the drum.
Figure 7:
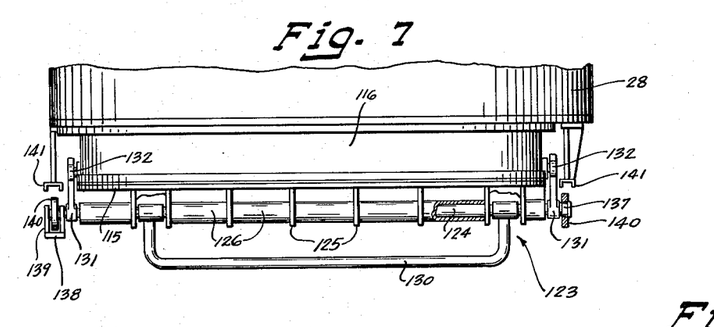
FIG. 7 is a plan view of the cover shown in FIG. 6.
Figure 8:
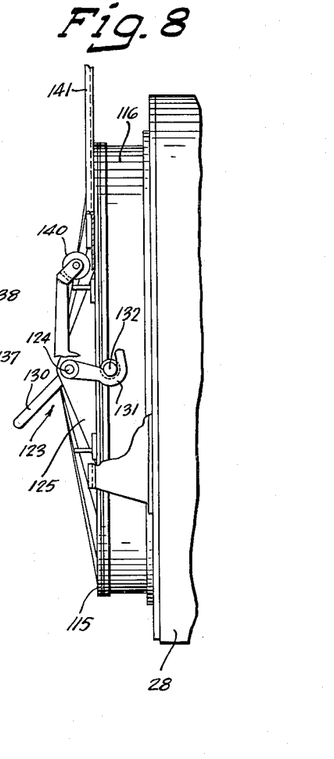
FIG. 8 is a view in side elevation of the cover depicted in FIG. 6.

The clamping mechanism 123 comprises a shaft 124 rotatably supported by a plurality of reinforcing ribs 125 fixed to the top of the cover 115. Spacers 126 are placed on the shaft 124 between the ribs 125 to maintain the proper spacing of the ribs. An elongated U-shaped handle 130 is rigidly secured to the shaft 124 for manipulating it in a rotary movement to operate the clamping mechanism 123. At each end of shaft 124 there is rigidly secured a hook 131 disposed to co-operate with pins 132 which are attached to the collar 116 to extend therefrom at diametrically opposite positions. To operate the clamping mechanism 123 after the cover has been properly positioned over the opening, it is only necessary to manipulate the handle 123 for the purpose of effecting a rotary movement of the shaft 124. As the shaft 124 is rotated, it pivots the hook 131 with it, into engagement with the pin 132, to draw the cover 115 toward the flange 117 and compress the seal 118 between them to effectively seal the opening.

The cover 115 is slidably mounted so that it may be moved away from the opening to a position where it will not interfere with the passage of the holder 62 into or out of the drum 29. To this end, the shaft 124 includes an eccentric 137 at each end, with each of the eccentrics 137 supporting a cross bar 138. A bracket 139 is attached to each end of the cross bars 138 with each of the brackets 139 rotatably supporting a wheel 140. The wheels 140 support the cover 115 for sliding movement, and are guided in their path of travel by the pair of guide tracks 141 fixed to the housing 28, in spaced relationship on either side of the cover 115.

By reason of the mounting of the cross bars 138 on the eccentrics 137, the wheels 140 are raised from the tracks 141 or lowered into engagement therewith as the occasion demands. Thus, when the shaft 124 is rotated to engage the hooks 131 with the pins 132 to clamp the cover 115 to the collar 116, the eccentrics 137 pivot with the shaft 124 in a direction to raise the cross bars 138 and their associated wheels 140 from the tracks 141 so that they will not interfere with the clamping of the cover 115 to the collar 116. On the other hand, when the shaft 124 is rotated in a direction to release the hooks 131 from the pins 132, the eccentrics 137 are pivoted in a direction to lower the cross bars 138 to bring the wheels 140 into contact with the tracks 141 and to raise the cover 115 slightly from the collar 116 so that the seal 118 and flange 117 are out of engagement. With the cover 115 thus raised away from the collar 116 it may be conveniently moved out of the way of the opening by simply sliding it along the tracks 141 to an upward position.

The cover 115 is large and cumbersome, and is therefore counterbalanced as illustrated in FIG. 1, to facilitate its movement. The counterbalancing system includes an upstanding bracket 145 attached to the machine, and supporting at its upper end a pulley 146. A cable 147 passes over the pulley 146, and is attached at one end to a counterweight (not shown), and at the other end to a bracket 148 attached to the periphery of the cover 115. The weight of the cover 115 is therefore balanced by the weight of the counterweight (not shown) so that the cover may be readily slid along the tracks 141 to either its upper or lower position.

The opposite end of the housing 28 is sealed by a hood 152 having windows 153 through which the operation of the cutter 21 may be observed. An opening 154 is formed in the hood 152 for receiving the quill 20, the opening being sealed by a plastic bushing 155 depicted in FIG. 2. The bushing 155 bears against the quill 20, and since the latter will vibrate while the cutter 21 is operating upon the titanium sponge, a floating mounting is provided for the bushing 155 so that it may vibrate with the quill 20. Such mounting comprises a ring 159 attached to the hood 152, and having a recess 160 for receiving a flange 161 of a collar 162. The collar 162 is recessed to receive the bushing 155 which is retained therein by a retainer 163 attached to the edge of the collar. It will be noted from the view in FIG. 2, that the flange 161 has a diameter somewhat smaller than the diameter of the recess 160 so that it may move therein to permit a limited movement of the bushing 155 with the quill 20. By providing such floating mounting for the bushing 155 damage to it as a result of the vibration of the quill 20 is avoided.

As previously mentioned the pure titanium sponge 57 is removed from the crucible 55 in one operation, and the impure titanium sponge 56 is removed in a second operation to separate the two compositions. In order to accomplish this, the cutter 21 is rendered expandible, and is illustrated in FIG. 2 in its retracted condition operating upon the pure titanium sponge 57. It will be noted that with the cutter 21 thus retracted, its diameter extends to the extremity of the mass of pure titanium sponge 57, and extends inwardly therefrom to overlap the axis of the crucible 55. While the cutter 21 is revolving, the drum 29 is also being rotated to rotate the crucible 55 with it for the purpose of feeding the titanium sponge 57 to the cutter 21 in a circular feeding movement at the same time that the spindle head 18 is being moved to the left as viewed in FIG. 1, to feed the cutter 21 at a preselected rate into the mass of titanium sponge 57 within the crucible 55.

With this arrangement, the cutter 21 forms a bore within the titanium mass to remove the pure titanium sponge 57 while leaving the layer of impure titanium sponge 56 intact and adhering to the wall of the crucible 55. When the cutter 21 has been fed inwardly to the bottom of the mass of pure titanium sponge 57, it is withdrawn from the crucible 55 and expanded so that its diameter extends to the wall of the crucible 55. The revolving cutter 21 is then again fed inwardly into the crucible 55 while the drum 29 is rotated to operate upon the layer of impure titanium sponge 56 to remove it from the crucible. In this operation, the cutter is fed to the bottom of the crucible to also remove the layer of impure titanium sponge located on the bottom surface of the crucible 55.

Figure 5:
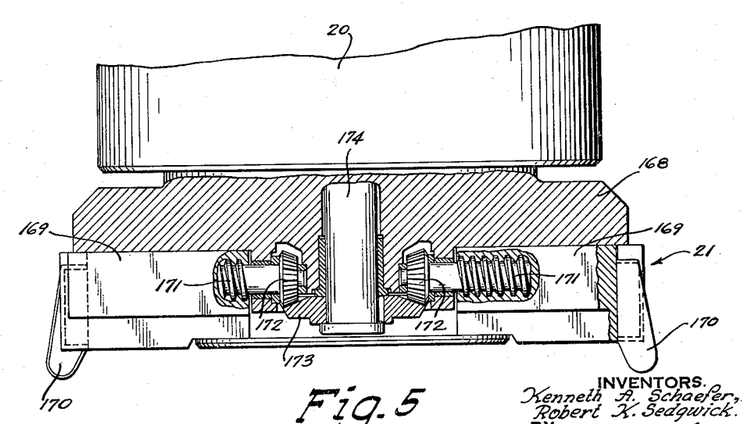
FIG. 5 is a view substantially in vertical section through the cutter illustrated in FIG. 1 attached to the spindle, showing the arrangement of the cutter teeth to render them movable for varying the diameter of the cutter.

Expansion and retraction of the cutter 21 is accomplished by power, while it is enclosed within the hood 152, without gaining access to it. This is achieved by the mechanism illustrated in FIG. 5 showing the details of the cutter 21, comprising a cutter body 168 attached to the spindle 19 to rotate with it. A plurality of slides 169 are slidably mounted in the cutter body 168 being disposed radially in equally spaced relationship for radial movement relative to the cutter body 168. A cutter tooth 170 is fixed to the outer end of each of the slides 169 in position to operate upon the titanium sponge when the cutter 21 is rotated. The opposite ends of the slides 169 are provided with a threaded bore for receiving a screw 171 journalled in the cutter body 168 and secured therein to prevent their axial movement. A bevel gear 172 is keyed to the interior end of each of the screws 171 in position to engage a single bevel gear 173. The latter is keyed to the exterior end of a shaft 174 which extends through the spindle 19 to the spindle head 18 where it is connected to be driven by suitable power means (not shown).

With this arrangement, the actuating power means (not shown) may be energized to effect rotation of the shaft 174 and its associated bevel gear 173. As the bevel gear 173 rotates it produces a corresponding rotation of its several mating bevel gears 172 to rotate the screws 171. Actuation of the screws 171 causes a uniform movement of the slides 169 and their associated cutter teeth 170 in either direction to thereby vary the diameter of the cutter 21.

The angular position of the crucible 55 serves to advantage in discharging the chips formed by the cutter 21 as it operates upon the titanium sponge within the crucible. Since the axis of the crucible 55 is tilted, with its open end lower than its closed end, the chips formed by the cutter 21 will fall to the wall of the crucible, and the rotational movement of the crucible will operate to urge the chips out of the crucible through its opening into the hood 152. A conduit 180 is in communication with the hood 152 in position to receive the chips being discharged from the crucible 55. The chips falling into the conduit 180 are directed into a hand truck 181 through a conduit 182 which is attached to the hand truck to communicate with its interior, and is connected to the conduit 180 by a flexible coupling 183.

When connected to the conduit 180, the hand truck 181 is located in a recess 184 formed in the machine, and is guided into proper position within this recess by guide tracks 185 secured to the floor upon which the base 10 rests. With this arrangement, the chips formed by the cutter 21 operating upon the titanium sponge conveniently fall through the conduit 180 into the hand truck 181 without being exposed to the air. The truck 181 may be readily disconnected from the conduit 180 and removed from the machine to transport the titanium sponge to the desired location. A second hand truck 181 may then be employed for similarly receiving the impure titanium sponge 56 as it is reduced to chips by the cutter 21 for removal from the crucible 55.

When all of the titanium sponge 56 and 57 has been removed from the crucible 55, the crucible and its holder 62 are removed as a unit from the drum 29. This step is facilitated by the action of an ejector rod 190 illustrated in FIGS. 1 and 2. It is connected within the base 10 to a power mechanism (not shown) and extends outwardly from the base 10 into the hood 152 where it is supported for sliding movement by a bushing 191. The power mechanism acts to move the ejector 190 axially for forcing the holder 62 and the crucible 55 contained therein out of the drum 29. The ejector rod 190 is shown in FIG. 2, in its fully retracted position and it may be locked in this position by manipulating a handle 192. It is movable axially to the left of this position, into contact with the flange 63 of the holder 62, and its continued movement to the left functions to force the holder 62 out of the drum 29 onto a ramp 195 formed on the base 10 and having rollers 194 upon which the holder 62 may readily slide. It is then conveniently lifted from the ramp 194 by a suitable crane (not shown) to remove it from the machine.

The several operating mechanisms of the machine are under the control of an electrical control circuit (not shown) which is actuated selectively by manipulating a plurality of switches mounted in a switch box 201. The switch box 201 is suspended from a pendant 202 to render it movable about the machine to the most convenient position for the operator.

From the foregoing detailed description of an explanation of the operation of the exemplifying machine tool herein set forth as a practical embodiment of the present invention, it will be apparent that there has been provided an improved machine tool especially adapted for machining a solid mass of material out of a container in two operations to separate two compositions of the material forming the mass within the container, and capable of operating on the material within a sealed enclosure under the atmosphere of an inert gas.

Although the illustrative embodiment of the invention has been described in considerable detail for the purpose of disclosing a practical operative structure whereby the invention may be practiced advantageously, it is to be understood that the particular apparatus described is intended to be illustrative only, and that the various novel characteristics of the invention may be incorporated in other structural forms without departing from the spirit and scope of the invention as defined in the subjoined claims.

The principles of this invention having now been fully explained in connection with the foregoing description, we hereby claim as our invention:

1. In a machine tool for machining a mass of material out of a cylindrical container having an axial opening, a base, a housing mounted on said base and having two openings, a drum rotatably supported in said housing, power means operably connected to rotate said drum, a removable holder supported in said drum and adapted to receive said container and to pass through the first of said two openings in the housing for insertion into the drum and removal therefrom, clamping means connected to clamp the holder in the drum so that it will rotate with the drum, locking means connected to lock the container in the holder so that it will rotate with the holder, a cover removably attached to the housing sealing the first of said two openings, a hood having an opening and secured to the housing to seal the second of the two openings in said housing, an ejector rod mounted on said base for axial movement with an end in position to engage an end of said holder when actuated to eject said holder and the container locked therein as a unit from the drum, a cutter carrying spindle rotatably mounted on the base to revolve the cutter and extending through the opening in said hood and the second of said two openings in the housing to carry the cutter within the housing, said spindle being also supported by the base for axial movement with its axis parallel to the axis of the drum but offset therefrom, power means operably connected to rotate said spindle, and feeding means operable to effect the axial movement of said spindle to move the cutter into the container within said housing for operating upon the material contained therein while the container is rotating to feed the material to the revolving cutter in a circular feeding movement.

2. In a machine tool for machining a mass of material out of a cylindrical container having an axial opening, a base, a drum rotatably mounted on said base and adapted to receive the container, power means operably connected to rotate said drum, locking means operable to lock the container in said drum so that the container will rotate with the drum, a cutter carrying spindle rotatably mounted on the base to revolve the cutter and supported by said base for axial movement with its axis parallel to the axis of the drum but offset therefrom, power means operably connected to rotate said spindle, and feeding means operable to effect the axial movement of said spindle to move the cutter into the container for operating upon the material contained therein while the container is being rotated to feed the material to the revolving cutter in a circular feeding movement, and an ejector mounted on said base and operably connected to eject the container from the drum when actuated, whereby after the material has been removed from the container, the ejector may be actuated to eject the container from the drum.

3. In a machine tool for machining a mass of material out of a cylindrical container having an axial opening, a base, a drum rotatably mounted on said base and adapted to receive the container, power means operably connected to rotate said drum, locking means operable to lock the container in said drum so that the container will rotate with the drum, a spindle rotatably mounted on the base and supported by said base for axial movement with its axis parallel to the axis of the drum but offset therefrom, power means operably connected to rotate said spindle, feeding means operable to effect the axial movement of said spindle, a variable diameter cutter attached to said spindle to rotate with it in position to face the open end of the container, so that it may move axially with the axial movement of the spindle, while rotating, to be fed into the container for operating upon the material contained therein, while the container is being rotated to feed the material to the revolving cutter in a circular feeding movement, said cutter being supported in position to overlap the axis of the container and extend therefrom to a point short of the wall of the container when radially retracted, and to the wall of the container when radially expanded, and an ejector mounted on said base and operably connected for selective operation to eject the container from the drum when actuated, whereby the core of the mass of material in the container may be machined with the cutter diameter retracted, while the outer layer may be operated upon in a second operation with the cutter diameter expanded, and after the material has been removed from the container said ejector may be actuated to eject the container from the drum.

4. In a machine tool for machining a mass of material out of a cylindrical container, a base, a housing mounted on said base and having two openings, a drum rotatably supported in said housing, power means operably connected to rotate said drum, a removable holder adapted to receive the container and to be inserted into said drum through the first of said two openings, a bracket, a plurality of legs slidably supported by said bracket to extend outwardly from said bracket in angularly spaced relationship and slidable radially to engage a recess in the inner wall of said drum for attaching the legs and their associated bracket as a unit to the drum, locking means including members on each of said legs operable to lock the holder to the drum so that it will rotate with the drum, clamping means operably connected to clamp the container in said holder with its opening coinciding with the second of said two openings in the housing, a cutter carrying spindle rotatably mounted on the base to revolve the cutter with its axis parallel to the axis of the drum but offset therefrom and movable axially, power means operably connected to rotate said spindle, and feeding means operable to effect the axial movement of said spindle to move the cutter into the container within said housing for operating upon the material contained therein while the container is rotating to feed the material to the revolving cutter in a circular feeding movement.

5. In a machine tool for machining a mass of material out of a cylindrical container having an axial opening, a base, a housing mounted on said base, a drum rotatably supported in said housing, power means operably connected to rotate said drum, a removable holder adapted to receive said container and to be inserted into said drum, locking means operably connected to lock the container in said holder, an arm hingedly supported by said housing, a bracket rotatably supported by said arm at its end opposite its hinged end, a plurality of legs slidably supported by said bracket to extend outwardly from the bracket in angularly spaced relationship and slidable radially to engage a recess in the inner wall of said drum for attaching the legs and their associated bracket as a unit to the drum, clamping means including members on each of said legs operable to clamp the holder to the drum so that it will rotate with the drum, a cutter carrying spindle rotatably mounted on the base to revolve the cutter with its axis parallel to the axis of the drum but offset therefrom and movable axially, power means operably connected to rotate said spindle, and feeding means operable to effect the axial movement of said spindle to move the cutter into the container within said housing for operating upon the material contained therein while the container is rotating to feed the material to the revolving cutter in a circular feeding movement.

6. In a machine tool for machining a mass of material out of a cylindrical container having an axial opening, a base, a support mounted on said base, a drum rotatably mounted on said support and adapted to receive the container, power means operably connected to rotate said drum, an arm hingedly carried by said support, a bracket rotatably supported by said arm at its end opposite its hinged end, a plurality of legs slidably supported by said bracket to extend outwardly from the bracket in angularly spaced relationship and slidable radially to engage a recess in the inner wall of said drum for attaching the legs and their associated bracket as a unit to the drum, a gear rack formed at the inner end of each of said legs, a shaft rotatably supported by said bracket, a pinion keyed to said shaft in position to mesh with each of said gear racks for actuating said legs in their radial movement to move them into and out of said recess, clamping means including members on each of said legs operably connected to clamp the container in the drum so that it will rotate with the drum, a cutter carrying spindle rotatably mounted on the base to revolve the cutter with its axis parallel to the axis of the drum but offset therefrom and movable axially, power means operably connected to rotate said spindle, and feeding means operable to effect the axial movement of said spindle to move the cutter into the container within said drum for operating upon the material contained therein while the container is rotating to feed the material to the revolving cutter in a circular feeding movement.

7. In a machine tool for machining a mass of material out of a cylindrical container having an axial opening, a base, a housing mounted on said base and having two openings, a drum rotatably supported in said housing, power means operably connected to rotate said drum, a removable holder adapted to receive the container and to be inserted into said drum through the first of said two openings, a bracket, a plurality of legs slidably supported by said bracket to extend outwardly from the bracket in angularly spaced relationship and slidable radially to engage a recess in the inner wall of said drum for attaching the legs and their associated bracket as a unit to the drum, locking means including members on each of said legs operable to lock the holder in the drum so that it will rotate with the drum, clamping means operably connected to clamp the container in said holder with its opening coinciding with the second of said two openings in the housing, a removable cover sealing said first opening, a hood having an opening and secured to the housing to seal the second of said two openings, a cutter carrying spindle rotatably mounted on the base to revolve the cutter with its axis parallel to the axis of the drum but offset therefrom and extending through the opening in said hood to carry the cutter within the housing, said spindle being also supported by the base for axial movement, power means operably connected to rotate said spindle, and feeding means operable to effect the axial movement of said spindle to move the cutter into the container within the housing for operating upon the material contained therein while the container is rotating to feed the material to the revolving cutter in a circular feeding movement.

8. In a machine tool for machining a mass of material out of a cylindrical container having an axial opening, a base, a drum rotatably supported on said base and presenting an annular tapered surface along the interior of its wall, a removable holder adapted to receive said container and to be inserted into said drum, said holder presenting an annular tapered surface along the exterior of its wall for engagement with the interior annular tapered surface of said drum to position and secure the holder within the drum, power means operably connected to rotate said drum, means including a rotary spider having radiating arms engageable with the drum and operable to apply pressure against the holder to force its tapered surface into tight engagement with the tapered surface of the drum to rigidly secure the holder within the drum so that it will rotate with the drum, locking means operably connected to lock the container within the holder so that it will rotate with the holder, a cutter carrying spindle rotatably mounted on the base to revolve the cutter with its axis parallel to the axis of the drum but offset therefrom and movable axially, power means operably connected to rotate said spindle, and feeding means operable to effect the axial movement of said spindle to move the cutter into the container within said drum for operating upon the material contained therein while the container is rotating to feed the material to the revolving cutter in a circular feeding movement.

9. In a machine tool for machining a mass of material out of a cylindrical container having an axial opening, a base, a drum rotatably supported on said base and presenting an annular tapered surface along the interior of its wall, a removable holder adapted to receive the container and to be inserted into said drum, said holder presenting an annular tapered surface along the exterior of its wall for engagement with the interior annular tapered surface of said drum to position and secure the holder within the drum, power means operably connected to rotate said drum, locking means operably connected to lock the container within the holder so that it will rotate with the holder, a bracket, a plurality of legs slidably supported by said bracket to extend from the bracket in angularly spaced relationship and slidable radially to engage a recess in the inner wall of said drum at the end opposite its tapered surface for attaching the legs and their associated bracket as a unit to the drum, a plurality of screws in threaded engagement with threaded holes in said legs in position to be tightened against said holder to apply pressure against it to force its tapered surface into tight engagement with the tapered surface of the drum to rigidly secure the holder within the drum so that it will rotate with the drum, a cutter carrying spindle rotatably mounted on the base to revolve the cutter with its axis parallel to the axis of the drum but offset therefrom and movable axially, power means operably connected to rotate said spindle, and feeding means operable to effect the axial movement of said spindle to move the cutter into the container within said drum for operating upon the material contained therein while the container is rotating to feed the material to the revolving cutter in a circular feeding movement.

10. In a machine tool for machining a mass of metal out of a cylindrical container, a base, a housing mounted on said base and having two openings with the first of these two openings being provided for admitting the container, means in said housing for rotatably supporting the container, power means operably connected to rotate the container in said housing, a removable cover sealing said first opening, a shaft pivotally supported by said cover, a plurality of pins secured to said housing, a plurality of hooks mounted on said shaft to pivot with it in position to be pivoted into engagement with said pins to draw the cover tightly against the housing over said first opening and retain it in that position to seal the opening, an eccentric formed at each end of said shaft for pivotal movement with the shaft, a pair of guide tracks secured to said housing in parallel relationship, a plurality of rollers supported by said eccentrics in position to engage said guide tracks for slidably supporting the cover, said eccentrics being arranged to move the rollers out of contact with the guide tracks when said hooks are moved into engagement with said pins to permit the cover to be drawn tightly against said housing and into contact with the guide tracks when the hooks are disengaged from the pins so that the rollers support the cover on the guide tracks for sliding movement toward and away from the housing opening, a cutter carrying spindle rotatably mounted on the base to revolve the cutter with its axis operationally parallel to the axis of the container but offset therefrom and to extend through the second opening in said housing to carry the cutter within the housing, said spindle being also supported by the base for axial movement, power means operably connected to rotate said spindle, and feeding means operable to effect the axial movement of said spindle to move the cutter into the container within the housing for operating upon the metal contained therein while the container is rotating to feed the metal to the revolving cutter in a circular feeding movement.

11. In a machine tool for machining a mass of material out of a cylindrical container, a base, a housing mounted on said base to rotatably support the container and having two openings with the first of these two openings being provided for admitting the container, means in said housing for rotatably supporting the container, power means operably connected to rotate the container in said housing, a removable cover sealing said first opening, clamping means connected to draw the cover tightly against the housing over its first opening when actuated and clamp it in that position to seal the opening, a pair of guide tracks secured to said housing in parallel relationship, a plurality of rollers supported by said cover in position to contact said guide tracks for slidably supporting the cover for movement in a definite path, said rollers being connected for movement relative to the cover with said clamping means so that they are moved out of contact with the guide tracks when said clamping means is actuated to clamp the cover to the housing to permit the cover to be drawn tightly against the housing and are moved into contact with the guide tracks when the clamping means is actuated to release the cover from the housing to support the cover for sliding movement on the guide tracks, a cutter carrying spindle rotatably mounted on the base to revolve the cutter with its axis operationally parallel to the axis of the container but offset therefrom and to extend through the second opening in said housing to carry the cutter within the housing, said spindle being also supported by the base for axial movement, power means operably connected to rotate said spindle, and feeding means operable to effect the axial movement of said spindle to move the cutter into the container within the housing for operating upon the material contained therein while the container is rotating to feed the material to the revolving cutter in a circular feeding movement.

12. In a machine tool for machining a mass of material out of a cylindrical container, a base, a housing mounted on said base and having two openings, a drum rotatably supported in said housing and presenting an annular tapered surface along the interior of its wall, power means operably connected to rotate said drum, a removable holder adapted to receive the container and to be inserted into said drum through the first opening in the housing, said holder presenting an annular tapered surface along the exterior of its wall for engagement with the interior annular tapered surface of said drum to position and secure the holder within the drum, means including a rotary spider having radiating arms engageable with the end of the drum and operable to apply pressure against the holder to force its tapered surface into tight engagement with the tapered surface of the drum to rigidly secure the holder within the drum so that it will rotate with the drum, locking means operably connected to lock the container within the holder so that it will rotate with the holder, a removable cover sealing said first opening and rotatably supporting said spider while being supported by said housing for movement to a position where it will not obstruct the opening, clamping means operably connected to draw the cover tightly against the housing over its first opening when actuated and clamp it in that position to seal the opening, a cutter carrying spindle rotatably mounted on the base to revolve the cutter and extending through the second opening in said housing with its axis parallel to the axis of the drum but offset therefrom, said spindle being movable axially, a seal about the second opening embracing said spindle for sealing the opening, power means operably connected to rotate said spindle, and feeding means operable to effect the axial movement of said spindle to move the cutter into the container within said housing for operating upon the material contained therein while the container is rotating to feed the material to the revolving cutter in a circular feeding movement, whereby the cutter may operate upon the material within the housing while the interior of the housing is sealed from the atmosphere.

13. In an apparatus for revolving a container having an open end, a base, a drum rotatably supported on said base and having both ends open, said drum having means to slidably seal against a tool spindle adapted to be extended therethrough into the drum, means operably connected to rotate said drum, a removable holder having an open end and adapted to receive the container and to be inserted into said drum with the open end of both the container and the holder and an open end of the drum in registration so that the tool spindle may be inserted through said sealing means into the container carried by said drum for operating on the material in the container, a bracket, a plurality of legs slidably supported by said bracket to extend outwardly from the bracket in angularly spaced relationship and slidable radially to engage a recess in the inner wall of said drum for attaching the legs and their associated bracket as a unit to the drum, locking means including members on each of said legs operable to lock the holder to the drum so that it will rotate with the drum, and clamping means operably connected to clamp the container in said holder, whereby container, holder, and drum may be rotated as a unit.

14. In an apparatus for revolving a container having an open end, a base, a housing mounted on said base and having both ends open with the first open end having means to slidably seal against a tool spindle adapted to be extended therethrough into the housing, a drum rotatably supported in said housing and having two open ends located adjacent to the respective open ends of said housing, means operably connected to rotate said drum, a removable holder having an open end and adapted to receive the container and to be inserted into said drum with the open end of both the container and the holder and an open end of the drum in registration adjacent to said sealing means so that the tool spindle may be inserted through said sealing means into the container within said housing for operating on the material in the container, locking means operably connected to lock the container in said holder, an arm hingedly supported by said housing, a bracket rotatably supported by said arm at its end opposite its hinged end, a plurality of legs slidably supported by said bracket to extend outwardly from the bracket in angularly spaced relationship and slidable radially to engage a recess in the inner wall of said drum for attaching the legs and their associated bracket as a unit to the drum, and clamping means including members on each of said legs operably connected to clamp the holder to the drum so that it will rotate with the drum, whereby the container, holder, and drum may be rotated as a unit.

15. In an apparatus for revolving a container having an open end, a base, a housing mounted on said base and having both ends open with the first open end having means to slidably seal against a tool spindle adapted to be extended therethrough into the housing, a drum rotatably supported in said housing and having two open ends located adjacent to the respective open ends of said housing, means operably connected to rotate said drum, a removable holder having an open end and adapted to receive the container and to be inserted into said drum with the open end of both the container and the holder and an open end of the drum in registration adjacent to the first opening of said housing so that the tool spindle may be inserted through said sealing means into the container within said housing for operating on the material in the container, locking means operably connected to lock the container in said holder, clamping means including a rotary spider having radiating arms operably connected to clamp said holder within said drum, and a removable cover sealing said housing opening and rotatably supporting said spider while being supported by said housing for movement to a position where it will not obstruct the housing opening, whereby the container, holder, and drum may be rotated as a unit within the housing, the interior of which may be sealed from the atmosphere.

16. In an apparatus for revolving a container having an open end, a base, a housing mounted on said base and having both ends open with the first open end having means to slidably seal against a tool spindle adapted to be extended therethrough into the housing, a drum rotatably supported in said housing and having two open ends located adjacent to the respective open ends of said housing, said drum presenting an annular tapered surface along the interior of its wall, means operably connected to rotate said drum, a removable holder having an open end and adapted to receive said container and to be inserted into said drum through the second opening in the housing with the open end of both the container and the holder and an open end of the drum in registration adjacent to the first opening of said housing so that the tool spindle may be inserted through said sealing means into the container within said housing for operating on the material in the container, said holder presenting an annular tapered surface along the exterior of its wall for engagement with the interior annular tapered surface of said drum to position and secure the holder within the drum, means including a rotary spider having radiating arms engageable with said drum and being operable to apply pressure against the holder to force its tapered surface into tight engagement with the tapered surface of the drum to rigidly secure the holder within the drum so that it will rotate with the drum, locking means operably connected to lock the container within the holder so that it will rotate with the holder, a cover rotatably supporting said spider and adapted to seal the second opening in said housing and movably supported by said housing for movement to a position where it will not obstruct the opening, and clamping means operably connected to draw the cover tightly against the housing over its second opening when actuated and clamp it in that position to seal the second opening, whereby the container, holder, and drum may be rotated as a unit within the housing while the cover is clamped over the second opening of said housing to seal the interior of the housing from the atmosphere.

References Cited in the file of this patent

UNITED STATES PATENTS

| | | |
|---|---|---|
| 981,392 | Dette | Jan. 10, 1911 |
| 999,208 | Cluthe | Aug. 1, 1911 |
| 1,137,483 | Hartough et al. | Apr. 27, 1915 |
| 1,143,132 | Peacock | June 15, 1915 |
| 1,220,827 | Downs | Mar. 27, 1917 |
| 1,660,532 | Steinbach | Feb. 28, 1928 |
| 1,832,868 | Kramer | Nov. 24, 1931 |
| 2,199,182 | Leonard | Apr. 30, 1940 |
| 2,272,219 | McCoy | Feb. 10, 1942 |
| 2,297,106 | Le Tourneau | Sept. 29, 1942 |
| 2,297,551 | Greve | Sept. 29, 1942 |
| 2,442,595 | Frunk | June 1, 1948 |
| 2,455,065 | Keller | Nov. 30, 1948 |
| 2,496,011 | Mikshel | Jan. 31, 1950 |
| 2,558,744 | Fouquet | July 3, 1951 |
| 2,671,293 | Grobey | Mar. 9, 1954 |
| 2,701,394 | Anderson | Feb. 8, 1955 |

FOREIGN PATENTS

| | | |
|---|---|---|
| 167,401 | Great Britain | Aug. 11, 1921 |